US007983687B2

(12) United States Patent
Englund et al.

(10) Patent No.: US 7,983,687 B2
(45) Date of Patent: Jul. 19, 2011

(54) SIGNAL TO INTERFERENCE RATIO ERROR AS A LOAD INSTABILITY INDICATOR FOR LOAD CONTROL IN CELLULAR SYSTEMS

(75) Inventors: Eva Englund, Linköping (SE); Fredrik Gunnarsson, Linköping (SE); Gunnar Bark, Linköping (SE); Patrik Karlsson, Älta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 843 days.

(21) Appl. No.: 11/798,331

(22) Filed: May 11, 2007

(65) Prior Publication Data

US 2008/0279121 A1    Nov. 13, 2008

(51) Int. Cl.
*H04W 72/00* (2009.01)

(52) U.S. Cl. ........ 455/450; 455/509; 455/513; 455/515; 370/329

(58) Field of Classification Search .................. 370/235; 455/450
See application file for complete search history.

(56) References Cited

U.S. PATENT DOCUMENTS

| 5,412,647 | A  | * | 5/1995  | Giroux et al.      | 370/232 |
| 7,123,596 | B2 | * | 10/2006 | Fukui              | 370/329 |
| 2004/0242253 | A1 | * | 12/2004 | Shen et al.        | 455/522 |
| 2006/0223446 | A1 | * | 10/2006 | Dominique et al.   | 455/69  |
| 2007/0086381 | A1 | * | 4/2007  | Lee et al.         | 370/331 |
| 2007/0258547 | A1 | * | 11/2007 | Montalbano         | 375/343 |
| 2008/0043623 | A1 | * | 2/2008  | Franceschini et al.| 370/235 |
| 2008/0084848 | A1 | * | 4/2008  | Jard et al.        | 370/332 |
| 2010/0067389 | A1 |   | 3/2010  | Helmersson et al.  |         |

FOREIGN PATENT DOCUMENTS

| WO | WO 2006/081875 | * | 8/2006 |
| WO | WO 2006/091137 |   | 8/2006 |
| WO | WO 2008/097145 |   | 8/2008 |

OTHER PUBLICATIONS

International Search Report and Written Opinion in corresponding International Application No. PCT/SE2008/050381 dated Sep. 24, 2008.
Cozzo et al., "Capacity Improvement with Interference Cancellation in the WCDMA Enhanced Uplink," The 17th Annual IEEE International Symposium on Personal, Indoor and Mobile Radio Communications (PIMRC '06).

* cited by examiner

*Primary Examiner* — Lester Kincaid
*Assistant Examiner* — Isaak R Jama
(74) *Attorney, Agent, or Firm* — Nixon & Vanderhye P.C.

(57) ABSTRACT

An uplink signal-to-interference ratio for each of multiple mobile radio terminal connections supported in a cell in a cellular communications system is estimated. A signal-to-interference ratio error is determined for selected ones of the estimated uplink signal-to-interference ratios. One or more signal-to-interference ratio errors are identified that exceed a signal-to-interference ratio error threshold. An instability indicator associated with the cell is determined based on the one or more identified signal-to-interference ratio errors. A load control decision and/or a decision for scheduling one or more uplink mobile radio transmissions in the cell may then be made based on the instability indicator, e.g., to prevent a transmission power rush in the uplink in the cell and/or to efficiently use available resources for uplink transmissions.

20 Claims, 8 Drawing Sheets

SIGNAL TO INTERFERENCE RATIO ERROR AS A LOAD INSTABILITY INDICATOR FOR LOAD CONTROL IN CELLULAR SYSTEMS

TECHNICAL FIELD

The technical field relates to cellular radio communications, and in particular, to cell load control in such a cellular radio system.

BACKGROUND

Universal Mobile Telecommunications System (UMTS) is a 3rd Generation (3G) asynchronous mobile communication system operating in Wideband Code Division Multiple Access (WCDMA) based on European systems, Global System for Mobile communications (GSM) and General Packet Radio Services (GPRS). Since the 1999 release of the basic 3GPP specifications for WCDMA, there have been several releases which improve on various aspects of that 1999 release. This continuing improvement is sometimes referred to as Long Term Evolution (LTE). In release 5 of the WCDMA 3GPP specifications, high speed downlink packet access (HSPDA) was introduced to reduce downlink delays and increase downlink data rate capability by approximately a factor of three. Release 6 of the WCDMA 3GPP specifications also reduces uplink delays and increases uplink data rate capability by approximately a factor of two.

Release 6 introduces a new uplink transport channel called the Enhanced Dedicated Channel (E-DCH) targeted for interactive, background, and streaming traffic. Compared to the normal uplink DCH, the E-DCH achieves improved uplink performance using a short transmission time interval (TTI), hybrid ARQ with soft combining, and scheduling. Reducing the TTI allows for an overall reduction in delay and faster hybrid ARQ retransmissions. Fast hybrid ARQ with soft combining reduces the number of retransmissions as well as the time between retransmissions. It also allows for a significant increase in capacity. Fast scheduling allows for rapid resource reallocation between UEs, exploiting the burstiness in packet data transmissions. It also allows the system to admit a larger number of high data rate users and rapidly adapt to interference variations, thereby leading to an increase in capacity as well as an increase in the likelihood that a user will experience high data rates. The functionality for controlling retransmission delay for hybrid ARQ and fast scheduling is implemented in the base station sometimes called the Node B in UMTS parlance.

In the downlink HSPDA, the transmission power and the code space is the shared resource, but in the uplink E-DCH, the interference "headroom" is the amount of shared resource (i.e., transmit power or interference) left to be allocated to one or more mobile terminals to transmit in the uplink. The common uplink resource shared among the mobile radio terminals (sometimes called user equipment (UE) in UMTS) is the total amount of tolerable interference, i.e., the total received power at the base station. The amount of common uplink resources allocated to a mobile terminal depends on the data rate (transport format) to be used. Generally, the higher the data rate, the larger the required transmission power/interference, and thus, the higher the resource consumption.

Scheduling is the mechanism that determines when a certain mobile terminal is allowed to transmit and at what maximum data rate. Packet data applications are typically bursty in nature with large and rapid variations in their resource requirements. Hence, the overall goal of the uplink scheduler is to allocate a large fraction of the shared resource to users momentarily requiring high data rates, while at the same time ensuring stable system operation by avoiding sudden interference peaks. Identifying this goal is one thing; achieving it is another.

The uplink dedicated channels DCHs in WCDMA are "fast" power-controlled, meaning that the base station measures the received DPCCH signal quality, e.g., the received signal to interference ratio (SIR), and compares the measurement to a desired signal quality, e.g., a SIR target value. If the measured SIR is less than or equal to the SIR target, the base station signals an "up" power control command to the mobile terminal to make it increase the power by a predefined step and a "down" power control command to the mobile terminal to make it increase its power by a predefined step if the received SIR is greater than the SIR target. The SIR target is regularly updated in a "slow" power control procedure known as outer loop power control (OLPC).

Because fast power control is used for the uplink, a mobile terminal transmitting when the channel conditions are favorable will generate the same amount of interference in the cell as a terminal transmitting in unfavorable channel conditions, given the same data rate for the two and sufficient power in the terminals to obey the power control commands. This is in contrast to HSDPA, where principally a constant transmission power is used, and the data rates are adapted to the channel conditions, resulting in a higher data rate for users with favorable radio conditions. However, for the uplink case the transmission power will be different for the two mobile terminals, and hence, the amount of interference generated in neighboring cells will differ.

The uplink scheduler for the enhanced uplink channel must be provided with an estimate of the allowed headroom for a cell for each scheduling period so that the scheduler can allocate the appropriate amount of uplink resources to requesting mobile terminals. But granting too much power to requesting mobile terminals can result in unstable power control conditions such as the "party effect" where an active mobile terminal responds to other terminals having increased their transmit power by increasing its own transmit power (the analogy being to a party where people all talk louder in an attempt to be heard in a louder environment). The effect is a power rush where multiple mobile terminals compete for signal to noise ratio (SIR) by raising their transmit power in an attempt to maintain their respective signal quality in an interference limited situation. A power rush can also occur when a terminal aims to achieve a higher SIR than what is possible due to the own-signal interference caused by time dispersion. When a mobile terminal's SIR reaches that region, the inner loop fast power control will not be able to reach the target SIR resulting in the base station sending a constant stream of power-up commands to the mobile terminal with a high risk of a power rush as the mobile terminal follows those commands.

In theory, a power rush may be depicted as a situation where the interference level goes to infinity, and the cell is completely blocked by the interference. In reality, the mobile terminals have limited output power which means that the interference in the cell will be high and many mobiles may lose link coverage leading to increased drop rate, increased inter-cell interference in neighboring cells, and reduced system capacity. Moreover, the terminals will use unnecessarily high power resulting in reduced battery life time. It would be desirable to avoid these unstable situations and to utilize uplink radio and mobile terminal battery resources more efficiently.

SUMMARY

An uplink signal-to-interference ratio for each of multiple mobile radio terminal connections supported in a cell in a cellular communications system is estimated. A signal-to-interference ratio error is determined for selected ones of the estimated uplink signal-to-interference ratios. One or more signal-to-interference ratio errors are identified that exceed a signal-to-interference ratio error threshold. An instability indicator associated with the cell is determined based on the one or more identified signal-to-interference ratio errors. A load control decision and/or a decision for scheduling one or more uplink mobile radio transmissions in the cell may then be made based on the instability indicator.

Scheduling decisions may be based on a headroom of available power between a maximum power level set for the cell and a current power level in the cell. Advantageously, the headroom of available power can be dynamically adjusted based on the instability indicator. A determination is made whether the instability indicator should be issued. The headroom of available power may be increased if the instability indicator is not issued, so that more resources are available for the one or more uplink mobile radio transmissions, or the headroom may be decreased if the instability indicator is issued, so that fewer resources are available for the one or more uplink mobile radio transmissions.

In a non-limiting example embodiment, the estimated uplink signal-to-interference ratios for each connection are averaged, and one or more of the averaged uplink signal-to-interference ratio estimates that exceed a signal-to-interference ratio estimate threshold are selected for use in determining one or more signal-to-interference ratio errors. In addition, a variance for multiple signal-to-interference ratio errors may be determined, the instability indicator associated with the cell is then determined a based on the variance. A leaky bucket procedure may be used to process the variance to determine whether the instability indicator should be issued.

Both a maximum uplink coverage load for the cell and a maximum uplink stability load may be determined for the cell. Ultimately, the lower of the two is chosen to be the maximum uplink load for the cell. In a non-limiting example implementation, the maximum uplink coverage load corresponds to a maximum rise over thermal noise for the cell. The maximum noise rise limit for uplink stability depends on the amount of inter-cell interference and other interference as well as radio propagation characteristics. The maximum uplink stability load limit is therefore dynamically adjusted according to the instability indications.

A scheduler in a radio base station can intelligently issue grants to one or more mobile radio terminals to transmit over an enhanced uplink channel. For example, scheduling can be performed to prevent an uplink transmission power rush in the cell based on the determined instability condition. Moreover, by dynamically adjusting the uplink transmission power headroom in the cell based on the instability indicator, better utilization of the available uplink transmission resource is achieved.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. The description is often given in the context of a UMTS communications system in order to provide an example and non-limiting context for explanation, but the technology described may be used in any modern cellular communications system that supports uplink communications from one or more mobile radio terminals. The term "mobile terminal" (sometimes called "user equipment") encompasses any type of device including phones, PDAs, lap tops, gaming devices, other computing or communications devices, etc. that have wireless communications capability.

In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 1:
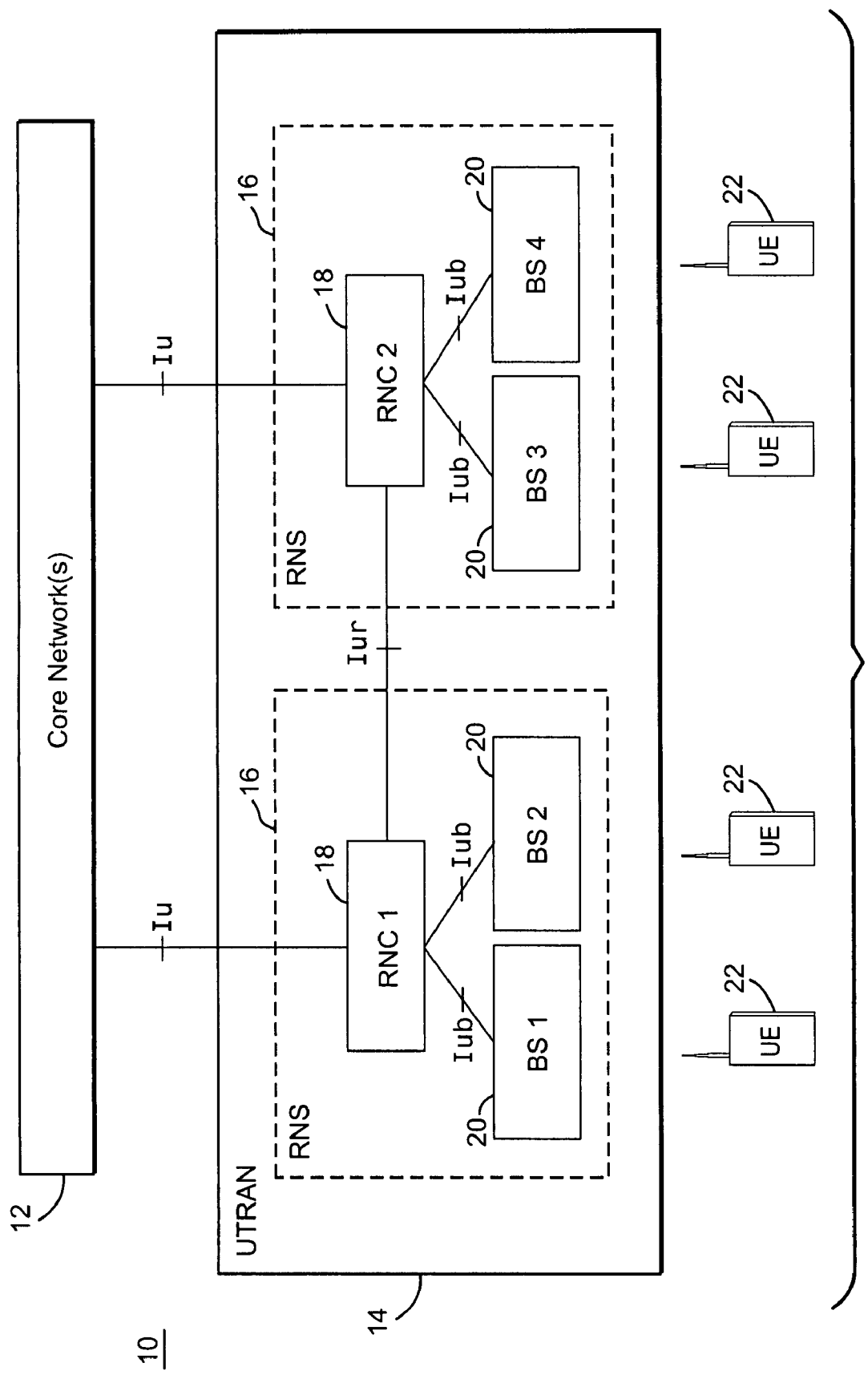
FIG. 1 illustrates high level diagram of a UMTS cellular radio communications system.

FIG. 1 illustrates a non-limiting example of a third generation, WCDMA-based cellular radio communication system 10. The User Equipment (UE) 22 is the mobile radio terminal by which a user/subscriber can access services offered by the operator's Core Network(s) 12. Those networks are coupled to other networks such as the public switched telephone network (PSTN) and the Internet (not shown). The UMTS Terrestrial Radio Access Network (UTRAN) 14 is responsible for the establishment and control of radio connections with the mobile UEs. The Radio Network Subsystem (RNS) 16 controls a number of Base Stations (BSs) 20 in the UTRAN 14. Each base station 20 coordinates radio communications in one or more cells. A cell covers a geographical area and is identified by a unique identity broadcast in the cell by its base station. There may be more than one cell covering the same geographical area. Each Radio Network Controller (RNC) 18 controls radio resources and radio connectivity within a set of cells.

FIG. 1 shows interfaces connecting the different nodes in the UTRAN 14. The Iu interface is defined between the core network 12 and the UTRAN 14. The Iur interface is defined for communications between RNCs 18. The Iub interface is defined for communications between the RNC 18 and its base stations 20. User data is transported on transport bearers over these interfaces. Depending on the transport network used, these transport bearers may be mapped to AAL2 connections (in case of an ATM-based transport network) or UDP connections (in case of an IP-based transport network).

Figure 2:
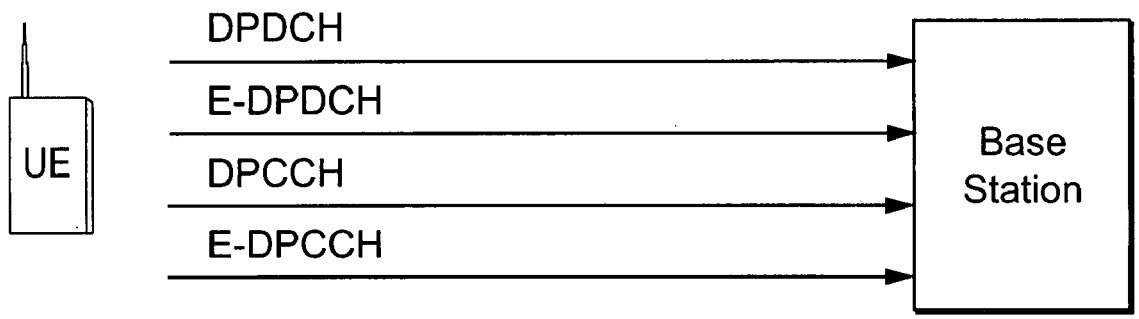
FIG. 2 is diagram illustrating several example uplink transmission channels.

As the UMTS has evolved, maximum uplink data rates have been increased using an enhanced uplink channel called the enhanced dedicated channel (E-DCH). The existing uplink dedicated channels (DCHs) are still used. The DCH and E-DCH are transport layer channels. FIG. 2 illustrates the uplink physical channels (from UE to base station) that support these transport channels. (Note that there are other uplink channels not shown in the Figure). Each DCH channel is supported by one or more dedicated physical data channels (DPDCHs) and a dedicated physical control channel (DPCCH). All the DPDCHs share the DPCCH. Each E-DCH channel is supported by one or more enhanced-dedicated physical data channels (E-DPDCHs) and an enhanced-dedicated physical control channel (E-DPCCH). All the E-DPDCHs share the E-DPCCH.

Figure 3:
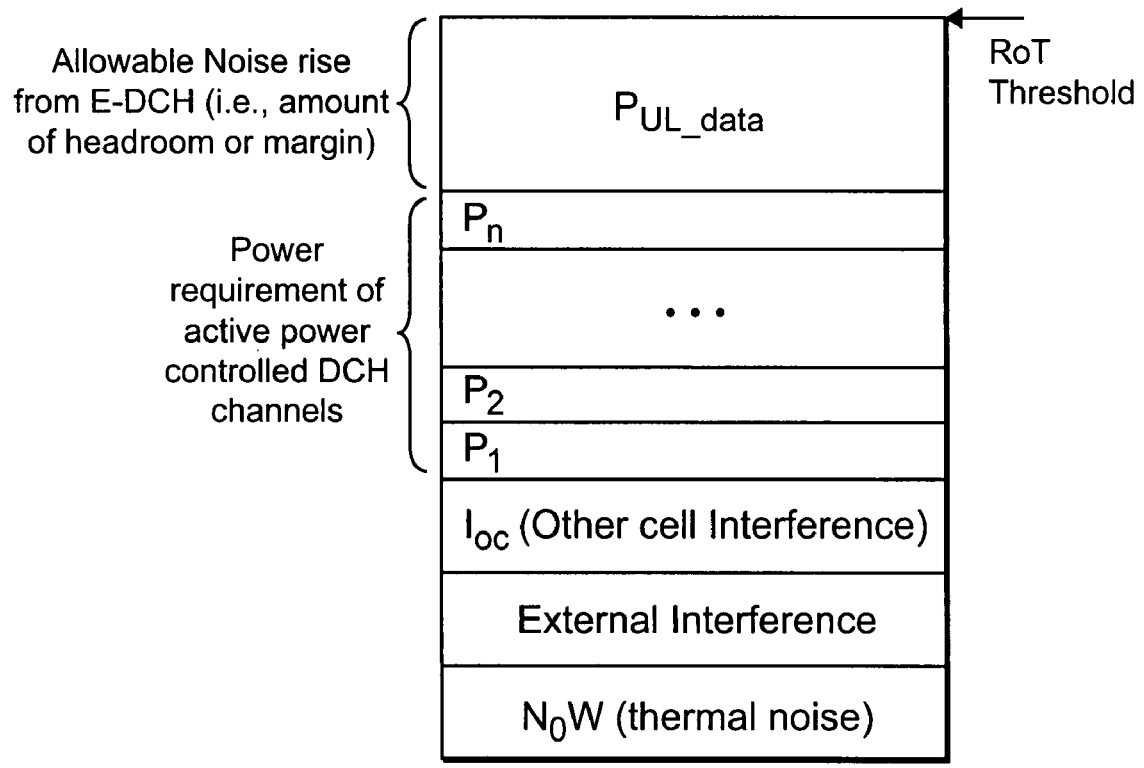
FIG. 3 is a diagram illustrating headroom along with other different components of the available uplink transmission resources in a cell.

Communications in the uplink must share a total uplink radio resource that can be expressed in a number of ways, e.g., a total uplink power like received total wideband power (RTWP), a total uplink interference, etc. That total uplink radio resource is limited, and the issue is how best to divide it. FIG. 3 illustrates an example resource allocation diagram. At the bottom, a portion of the total available uplink power is consumed by thermal noise $N_0W$. Next, a portion of the power is assigned to account for external interference, i.e., interference that is not generated by other users in the same cellular system, such as interference from other co-sited cellular systems or interference from undesired electro-magnetic emissions from other electronic equipment. A portion of the power must be allocated to interference in this cell from transmitters in neighboring cells (sometimes called inter-cell interference). Another block of the uplink power is allocated in sub-blocks $P_1, P_2, \ldots, P_n$ to the dedicated uplink channels in the cell. The remaining uplink power $P_{UL\_data}$ extends from there up to a maximum power indicated as rise over thermal (RoT) threshold. These are the remaining resources available for use by the E-DCH and are sometimes called the "headroom."

Figure 4:
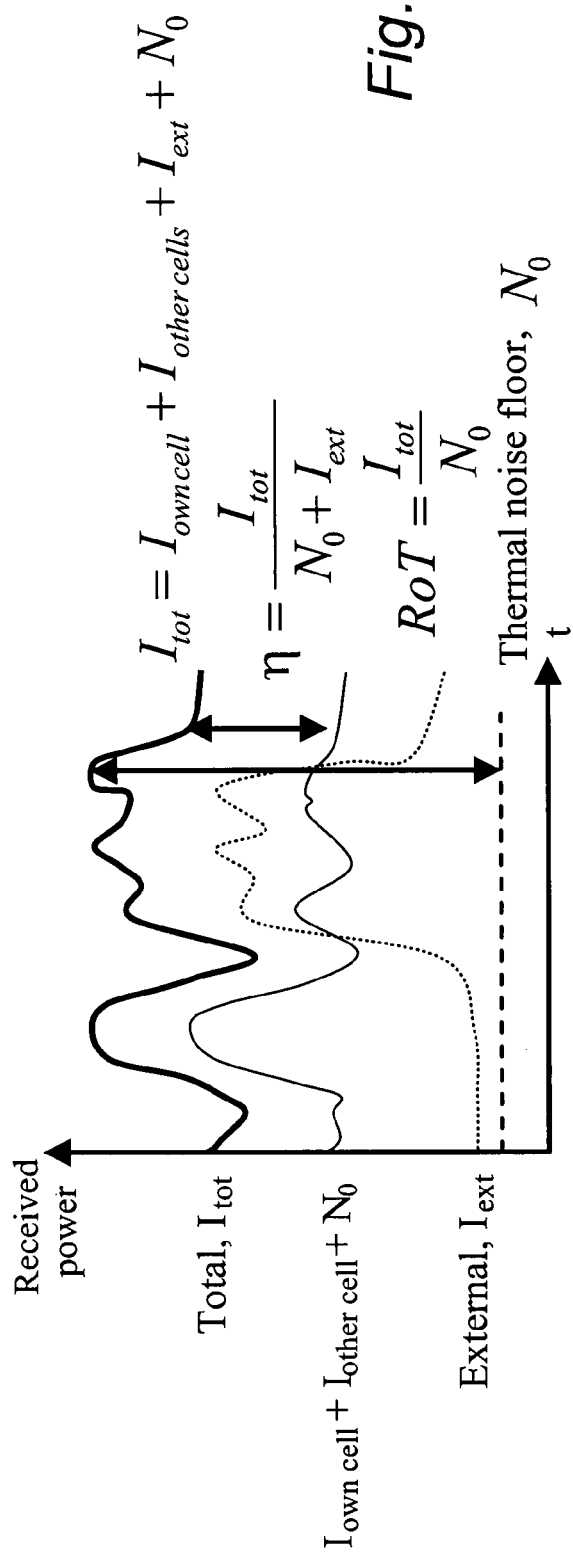
FIG. 4 is a graph of received power versus time illustrating uplink interference components in the cell.

FIG. 4 is a graph of received power in the uplink versus time that helps illustrate conceptually this division and sharing of the total uplink resources expressed in terms of interference. The total received power, $I_{tot}$, in a cell consists of power from users in their own cell, $I_{own\_cell}$, users in other cells, $I_{other\_cell}$, as well as external interference, $I_{ext}$, and thermal noise power, $N_0$:

$$I_{tot} = I_{own\_cell} + I_{other\_cell} + I_{ext} + N_0.$$

All interference components may vary extensively over time. The rise over thermal (RoT) is defined as the total received power over the thermal noise power, $$RoT = \frac{I_{tot}}{N_0}.$$

The uplink coverage limitation is expressed as the maximum rise over thermal for which the cell coverage is still maintained: $RoT < RoT_{max}$.

Because the uplink interference typically continually varies, it is difficult to know how much headroom exists at any particular time. A fixed, worst case headroom could be employed, but that would not be very efficient because very often some of the useable resources will not be allocated. A better way is to provide a dynamic estimate of the headroom that reflects the headroom resources actually available. The inventors recognized that such a dynamic headroom estimate should take into account a cell load that maintains stability in the uplink power control used in the cell and that guarantees a minimum uplink coverage in the cell.

For the stability limitation, the external interference $I_{ext}$ does not contribute to the cell load, L, defined as:

$$L = 1 - \frac{1}{\eta}$$

where the noise rise $\eta$ is defined as:

$$\eta = \frac{I_{tot}}{N_0 + I_{ext}}.$$

If there is no or negligible external interference, the noise rise is the same as the rise-over-thermal (RoT):

$$RoT = \frac{I_{tot}}{N_0}.$$

Figure 5:
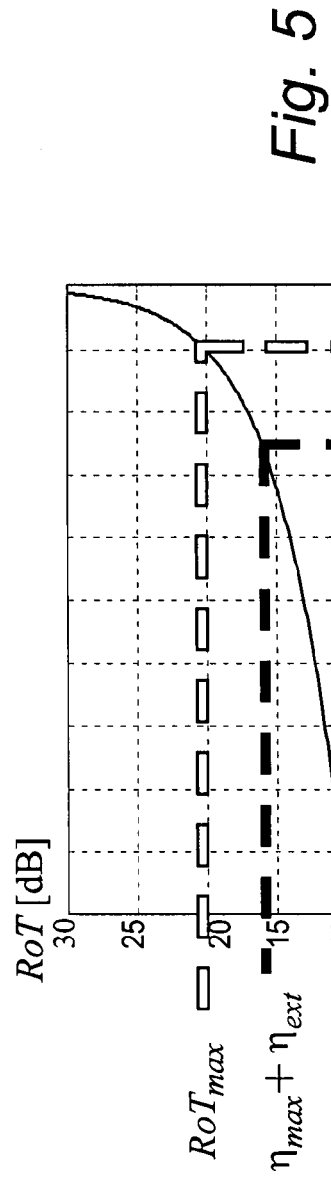
FIG. 5 is graph of rise over thermal (RoT) versus load in a cell.

FIG. 5 is a graph that illustrates RoT versus cell load L. The cell load L increases with noise rise $\eta$ and with RoT. As the load approaches "1", the uplink power control in the cell becomes unstable, which in theory causes the RoT to approach infinity, as shown, but in reality results in power rushes. To guarantee stable operation, the load must not exceed a certain limit, $L < L_{max,S}$. To guarantee adequate uplink cell coverage, the load must not exceed a certain limit, $L < L_{max,RoT}$. FIG. 5 shows that $L_{max,S}$ and $L_{max,RoT}$ are not always the same. So the overall uplink load in the cell, L, should not exceed either the coverage or the stability limitations, which means that the lower load maximum effectively sets the cell's maximum load.

The following equation expresses that the maximum uplink cell load is the smaller ("min") of the coverage and stability maximum loads:

$$L < L_{max} = \min\{L_{max,RoT}, L_{max,S}\}$$

Figure 6:
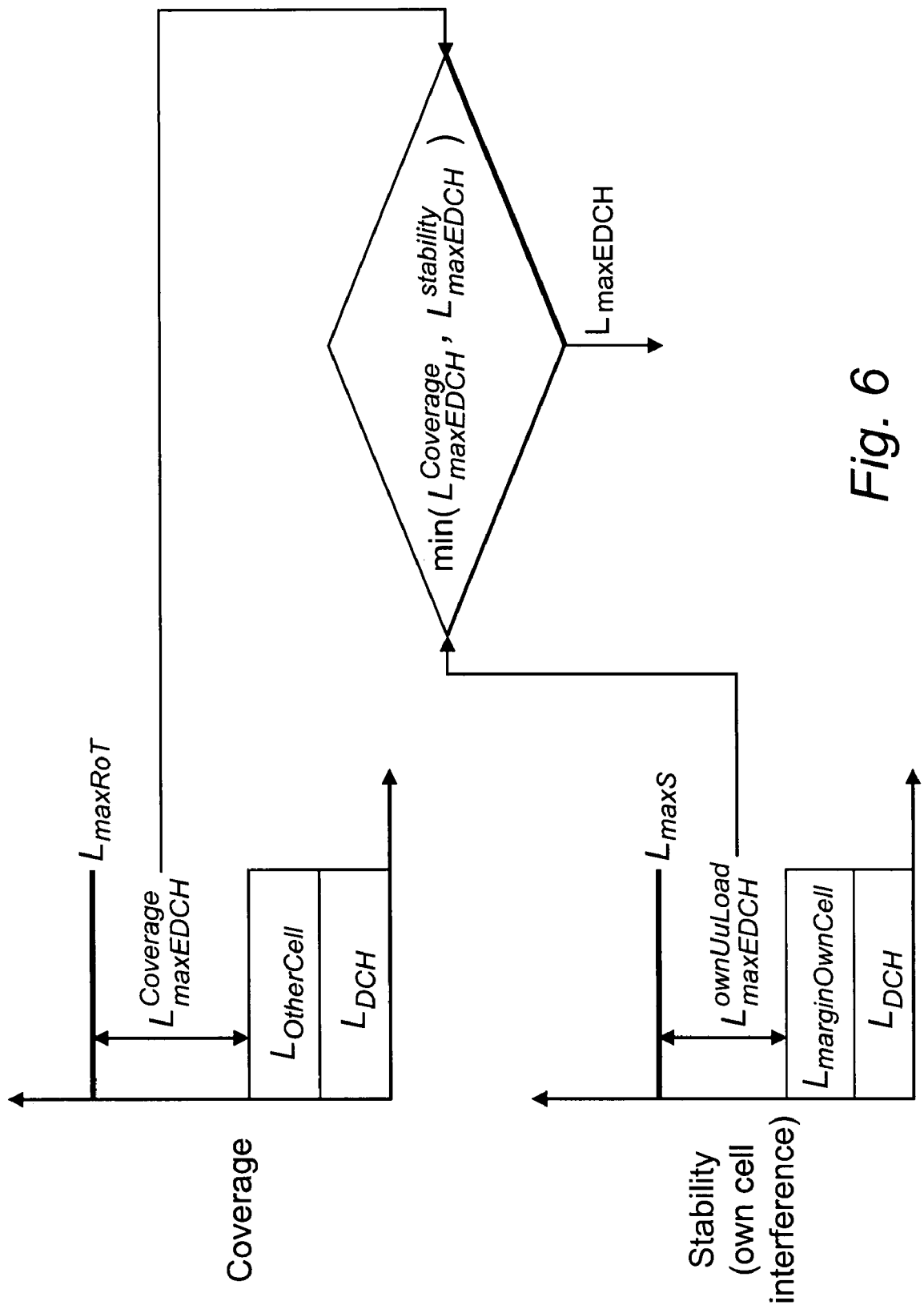
FIG. 6 is diagram illustrating how a maximum load associated with an enhanced uplink channel may be selected.

FIG. 6 is a flowchart type diagram that illustrates this point by showing that the respective headrooms associated with the maximum coverage and the minimum stability may be different and that a decision is made to select the lower of the two to function as the effective load limit for enhanced uplink communications in the cell: $L_{maxEDCH}$.

The load estimation approach, described in the non-limiting example context of an enhanced uplink channel like the E-DCH for use in scheduling uplink transmissions, estimates the scheduling headroom. That headroom is expressed as a maximum load $L_{max,EDCH}$ at time t+1, $L_{max,EDCH}(t+1)$, by subtracting the estimated non-E-DCH load at time t, $L_{non-EDCH}(t)$, from respective limits, $L_{maxRoT}$ and $L_{maxS}$. In addition, some headroom is assumed for additional interference including $L_{other}(t)$ for coverage and $L_{margin}(t)$ for stability as follows:

$$L_{maxEDCH}(t+1) = \min\begin{Bmatrix} L_{maxRoT} - L_{nonEDCH}(t) - L_{other}(t), \\ L_{maxS} - L_{nonEDCH}(t) - L_{margin}(t) \end{Bmatrix}$$

For coverage limitations, $L_{other}(t)$ is a margin needed for other-cell interference as well as the external interference (see FIG. 4). This margin can be a fixed margin dependent on the cell deployment or it could be dynamically adjusted based on RoT measurements. One non-limiting example of dynamically adjusting the margin using RoT measurements is described in commonly-assigned U.S. patent application Ser. No. 12/447,823, corresponding to PCT application PCT/SE06/50453, filed on Nov. 6, 2006, and incorporated herein by reference. From the expressions on noise rise, η, RoT, and load, L, above, the load can be expressed in terms of RoT as:

$$L = 1 - \frac{1}{\eta} = 1 - \frac{N_0 + I_{ext}}{I_{tot}} = \frac{1 + I_{ext}/N_0}{I_{tot}/N_0} = \frac{1 + I_{ext}/N_0}{RoT}.$$

The maximum load due to the maximum, $L_{max,RoT}$ may then be expressed as:

$$L_{max,RoT} = \frac{1 + I_{ext}/N_0}{RoT_{max}}.$$

The stability limitation, $L_{margin}(t)$, only accounts for other-cell interference and does not consider the external interference. Unfortunately, it is not possible to extract the external part of the interference from RoT measurements. To overcome this obstacle, the inventors utilize signal-to-interference ratio (SIR) error (SIRerror) in the uplink to determine an instability indicator that informs the uplink scheduler when the cell stability maximum is or is close to being reached. The scheduler can then back-off the amount of uplink resources scheduled to ensure stability and avoid a power rush. At the same time, the scheduler may allocate resources freely up to the currently estimated headroom maximum to fully utilize existing capacity. Maximum resources can be scheduled in the absence of an instability indicator, and less in the presence of one or more instability indicators.

Figure 7:
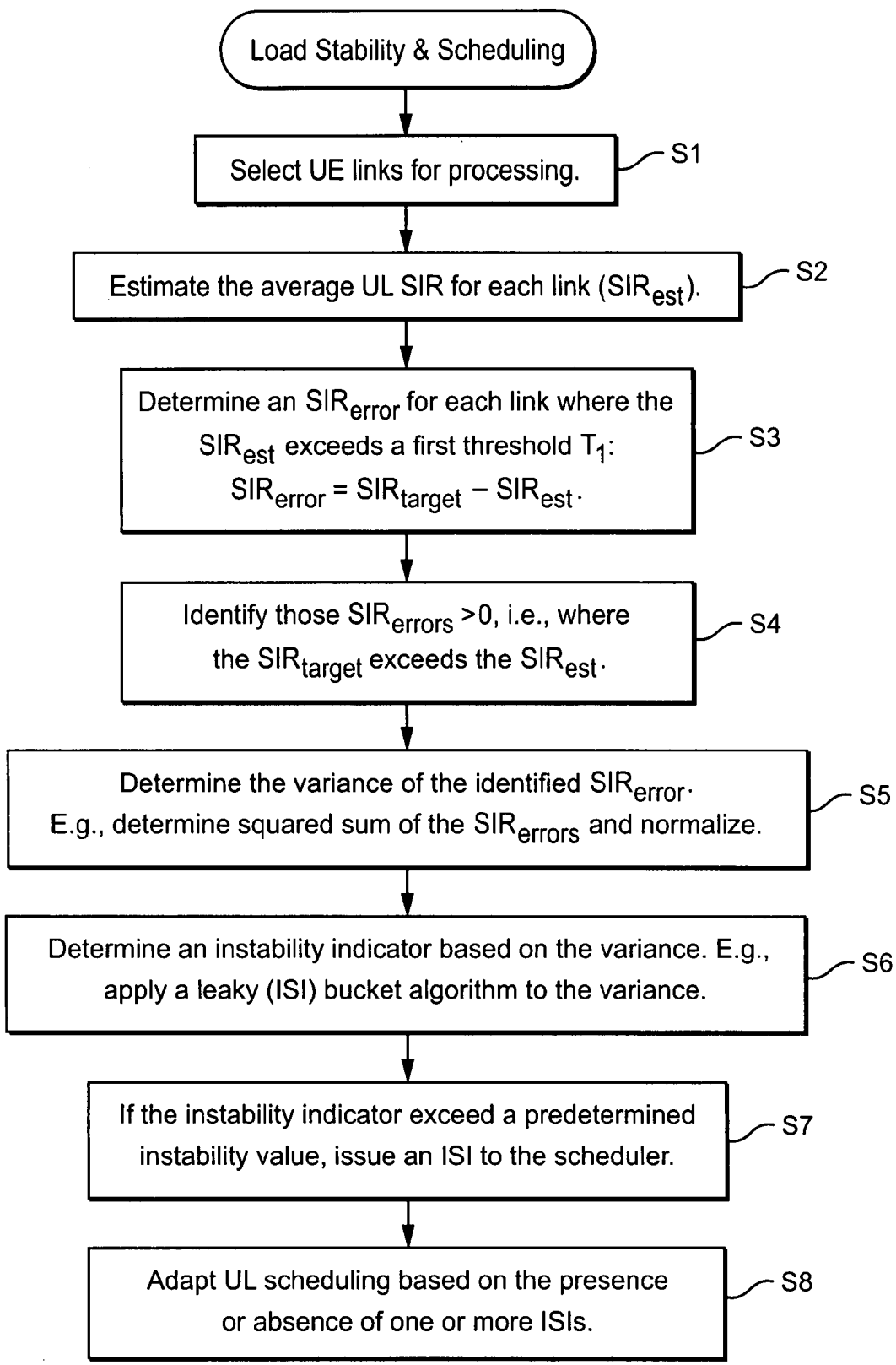
FIG. 7 is a flowchart illustrating example, non-limiting procedures for load stability and uplink transmission scheduling in a cell.

FIG. 7 illustrates a load stability and uplink transmission scheduling flowchart outlining example, non-limiting procedures to determine and use an instability indicator. These procedures may be implemented in one or more network nodes, but in a preferred example embodiment, they may be implemented in a base station node associated with the cell. First, some number of active uplink connections from mobile terminal UEs are selected for processing to determine SIRerrors (step S1). An average uplink (UL) SIR for each uplink connection (SIRest) is estimated either by measuring it at the base station or by calculating it (step S2). An SIRerror is determined for each link, preferably only for those links where the SIRest exceeds a first threshold $T_1$ (step S3). This thresholding removes SIRest values that are too low and may distort the statistical results. The SIRerror is then determined by subtracting the SIRest for each selected UE link from an SIRtarget value. From the SIRerror, the instability indicator (ISI) is determined.

The following is one non-limiting example way to determine the instability indicator (ISI). Those SIRerrors that exceed a threshold, e.g., zero, are identified (Step S4). A statistical variance is then preferably determined of those identified errors (step S5). Such a variance may be determined, for example, by squaring the sum of the SIRerrors and then normalizing that sum. An instability indicator (ISI) is determined based on the variance (step S6). The SIR error variance for the selected links may be further processed using a leaky bucket algorithm described below. If the instability indicator exceeds a predetermined instability value, an instability indicator message may be issued to the uplink scheduler (step S7). The scheduler may then adapt the uplink scheduling based on the presence or absence of the instability indicator(s) (step S8). For example, the scheduling headroom can be modified by adjusting the stability limitation margin $L_{margin}(t)$. In a non-limiting example, a "jump" algorithm can be used where the margin $L_{margin}(t)$ is increased (reducing the scheduling head room) by a predetermined step size when instability is detected. If there has been to indication of instability during a predefined time, then the margin may be reduced gradually to a minimum limit.

As mentioned above, the SIRerror variance may be processed in one non-limiting example embodiment using a leaky bucket algorithm which in effect is an accumulative sum detector for detecting a potential power rush and issue an instability indicator. For each uplink connection and in each time period or slot, l, an estimate of the SIR for the DPCCH is measured or calculated using any appropriate method, $\gamma_{est}(l)$.

The SIR estimate is then preferably averaged over N slots, where N can be any positive integer (non-limiting example values for N include 3 corresponding to a 2 ms TTI (Transmission Time Interval) and 15 for a 10 ms TTI):

$$SIR_{est} = 10 \cdot \log\left(\frac{1}{N} \sum_{l=1\ldots N} \gamma_{est}(l)\right)$$

The $SIR_{est}$ is then subtracted from a SIR target (in dB) to get the SIRerror:

$$SIR_{err} = SIR_{target} - SIR_{est}.$$

The $SIR_{err,i}(t)$ denotes the SIRerror as defined above for link i at a discrete time instance t and $SIR_{est}(t)$ denotes the corresponding SIR estimate. All links that have a SIR estimate exceeding a first threshold, $T_1$, are identified to avoid bad SIR estimates. SIRerror values associated with those identified SIR estimates are then compared to a second threshold $T_2$ to see if the SIR error is smaller than the second threshold:

$$k' = \{\text{links } i : (SIR_{est} > T_1) \& (SIR_{err,i}(t) > T_2)\}$$

For links that are in soft handover, the uplink transmission is received simultaneously by two or more cells, and the mobile terminal is power-controlled from several cells rather than just one cell. This means that the SIRtarget does not need to be reached in all cells and that the SIRerror does not necessary reflect an initial power rush. If the number of soft handover links is large in relation to the total number of links, then this could cause a false alarm triggering of the ISI. To avoid this situation, links in soft handover can be removed from the set of links used for the instability triggering analysis. In that case, k may be set to include the links in k' that are not in soft handover.

In each time instance i, the SIRerror for the k links is squared. Further, the squared sum is taken over mobile terminals, k, and normalized with respect to the total number of links, M, to determine the SIRerror variance as follows:

$$x(t) = \frac{1}{M} \cdot \sum_{links\ in\ k} (SIR_{err,i}(t))^2.$$

Figure 8:
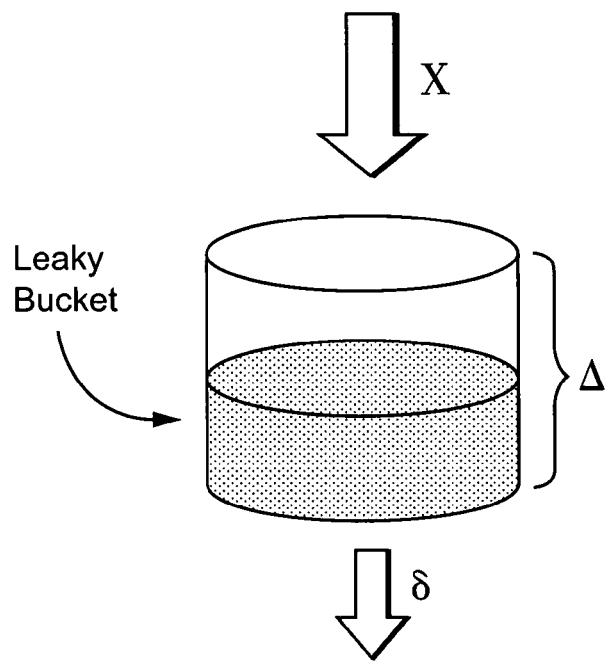
FIG. 8 illustrates the principle of a leaky bucket algorithm.

A cumulative sum (CUSUM) detector, often referred to as a "leaky bucket" is applied to the variance x(t). Consider the conceptual drawing in FIG. 8. A leaky bucket corresponding to a sum y(t) provides a mechanism by which an irregular or bursty input x(t) can be shaped to present a steady stream output rather than an erratic output δ with low-volume and high-volume flows. The output δ is subtracted from the cumulative sum. When the cumulative sum y(t) (the amount of water in the bucket) exceeds a limit, Δ, the cumulative sum y(t) is reset, and an instability indicator ISI(t) is set. This is expressed mathematically below starting with an empty bucket.

$$y(0) = x(0)$$

$$y(t) = \begin{cases} \min\{y(t-1) + x(t) - \delta, 0\} & \text{if } y(t-1) + x(t) - \delta < \Delta \\ 0 & \text{if } y(t-1) + x(t) - \delta > \Delta \end{cases}$$

$$t = 1, 2, 3 \ldots$$

$$ISI(t) = \begin{cases} 0 & \text{if } y(t-1) + x(t) - \delta < \Delta \\ 1 & \text{if } y(t-1) + x(t) - \delta > \Delta \end{cases}$$

$$t = 1, 2, 3 \ldots$$

where Δ is the size of the bucket.

The input x fills the bucket, and δ empties the bucket. Because δ does not vary in time, the bucket is emptied in an even pace. Input x on the other hand varies considerably over time, but it is desirable to avoid triggering the instability indicator too quickly to avoid false alarms. If x exceeds δ, the bucket fills up, and if x is smaller than δ, the bucket empties. If x exceeds δ for a longer period of time, the bucket eventually "spills over," at which point, the instability indicator may be issued. The size of the bucket is adjusted by changing Δ. Although the leaky bucket approach is useful because it avoids false instability alarms, other approaches may also be used such as different filtering techniques.

Figure 9:
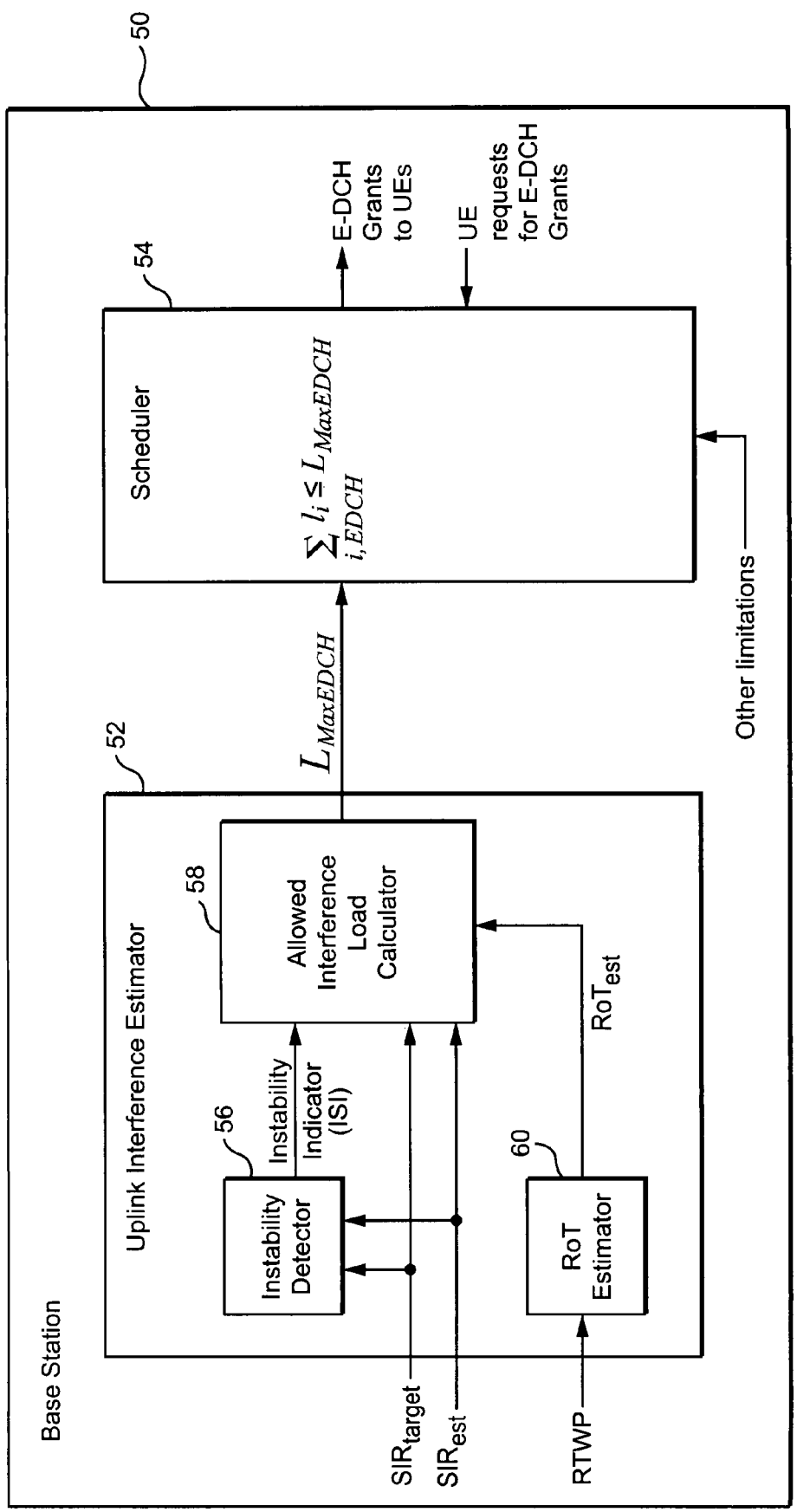
FIG. 9 is function block diagram of a non-limiting example of an uplink interference estimator and a scheduler used in a base station.

FIG. 9 is function block diagram of a non-limiting example of an uplink interference estimator 52 and a scheduler 54 implemented in a base station 50. The uplink interference estimator 52 includes an instability detector 56 coupled to an allowed interference load calculator 58. The instability detector 56 receives $SIR_{target}$ values as well as SIR measurements for the various uplink UE channels for use in calculating an instability indicator, for example, using the non-limiting methodology explained above. An instability indicator (ISI), if issued, is provided to the allowed interference load calculator 58 which also receives the SIR measurements as well as a rise over thermal estimate ($RoT_{est}$) from the RoT estimator 60. The RoT estimator 60 generates its estimate based on the received total wideband tower measured at the base station 50. The allowed interference load calculator 58 then calculates the maximum load currently permitted in the cell for the uplink enhanced dedicated channel (E-DCH) and provides it to the scheduler 54.

The scheduler 54 receives a number of requests from mobile terminals for grants to transmit over the enhanced dedicated uplink channel. It determines scheduling grants for transmission over the E-DCH to the mobile terminals based on the received maximum E-DCH load received from the interference load calculator 58. The scheduler 54 assigns the available resource to the mobile terminals requesting resources by issuing grants. For example, if the maximum scheduling load headroom for E-DCH, $L_{max,EDCH}$, has been decreased through an instability indication, then the scheduler will need to reduce the load by decreasing one or more grants. Typically, the scheduler 54 will select the lowest prioritized user, decrease the grant by a certain step size, and proceed to the next lowest prioritized user until the load does not exceed the limit.

Figure 10:
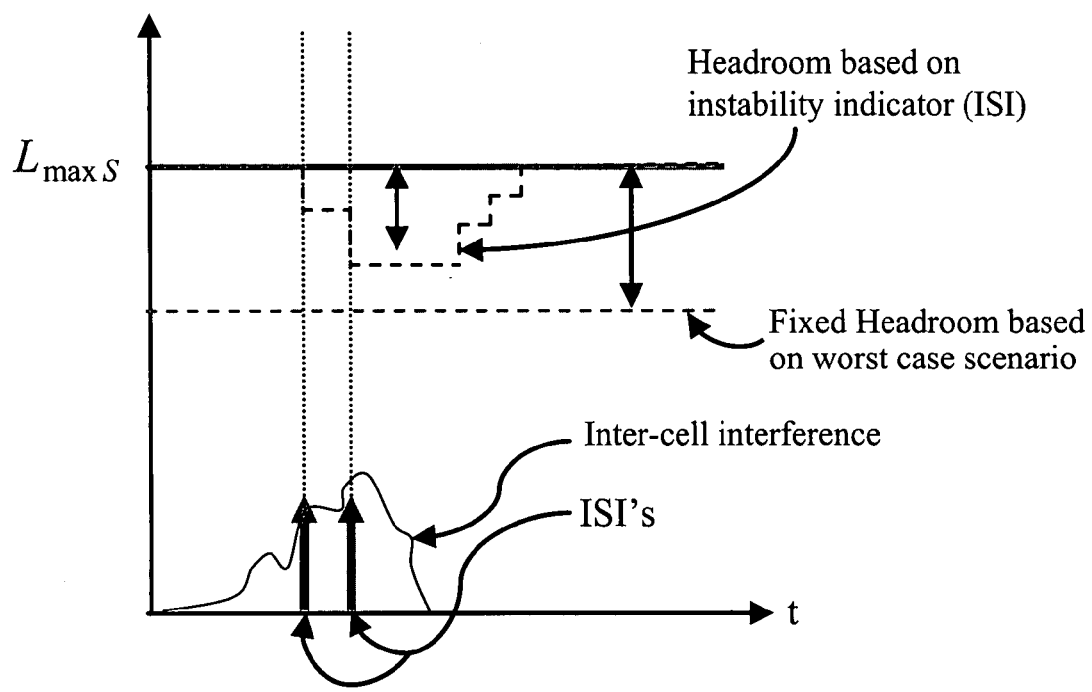
FIG. 10 is a graph of maximum load stability versus time illustrating how the presence and the absence of an instability indicator (ISI) causes adjustment of the headroom or margin.

The following graphs help illustrate how the instability indicator can be used to efficiently allocate uplink resources while at the same time preserving power control stability in the cell using load control. FIG. 10 is a graph of maximum load stability versus time and illustrates how the presence and the absence of an instability indicator (ISI) causes adjustment of the head room or margin. As explained above, increasing the margin $L_{margin}(t)$ reduces the scheduling head room. The maximum stabile load $L_{max}S$ is shown as a bold horizontal line at the top of graph. Lower down is a dashed line that represents a fixed head room (or margin) based on a worse case cell load scenario. The difference between the two horizontal lines is the potential additional capacity that may be allocated to the enhanced uplink channel using the instability indicator technology described above.

In the absence of substantial inter-cell interference, the full additional capacity is employed for the enhanced uplink transmissions. But if the inter-cell interference increases, a first instability indicator is issued as a first bold vertical arrow. This ISI is predicting a potential power rush. In response, the scheduler dynamically adapts (reduces) the head room by increasing the margin, thereby allocating additional uplink resources to compensate for the higher inter-cell interference being predicted. The second instability indicator arrow triggers yet another increase in margin as shown. If no further instability indicators are issued after some time period, the margin can be decreased gradually, e.g., using incremental step increases as shown in the figure, in order to increase the headroom. In this way, the E-DCH load control can operate close to the stability limit and more effectively use the available uplink resources.

Figure 11:
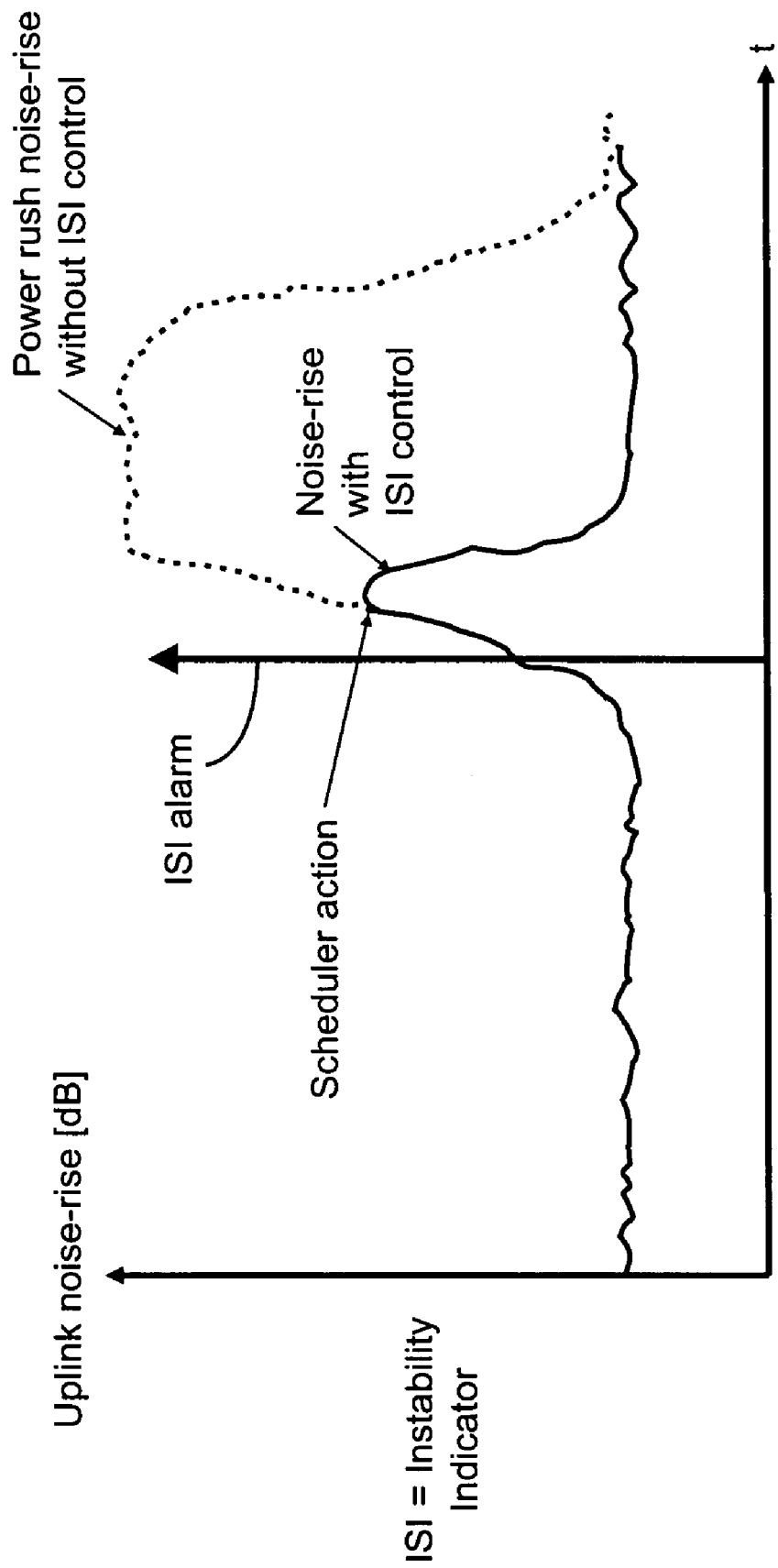
FIG. 11 is a graph showing uplink noise-rise versus time including a power rush noise rise without ISI control and much more stable noise rise with ISI control.

FIG. 11 is a graph showing uplink noise-rise versus time as the uplink noise rise is increasing in the middle of the graph, if no action is taken by the scheduler, a power rush noise rise occurs as indicated by the top graph line. This is undesirable for the reasons already described. But if an ISI alarm is issued to the scheduler, it can take action as shown in the lower graph line to avoid a power rush and to reduce the noise rise in order to ensure stable operation.

The instability indication technology enables the uplink load controller like the E-DCH scheduler to operate much closer to the power control stability limit, which results in better usage of high data rates and increases capacity in non-power limited networks. At the same time, transmission power rushes are prevented so that connection drop rates and inter-cell interference in neighboring cells are decreased. By avoiding power rushes, the mobile terminals use less power and thereby increasing the mobile battery life time.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for use in a cell in a cellular communications system where the cell supports multiple mobile radio terminal connections with mobile radio terminals, comprising: selecting at a serving cell a number of active uplink mobile radio terminal connections; estimating uplink signal-to-interference ratios for the number of mobile radio terminal connections; determining signal-to-interference ratio errors for the estimated uplink signal-to-interference ratios; identifying one or more signal-to-interference ratio errors that exceed a signal-to-interference ratio error threshold; determining an instability indicator associated with the cell based on the one or more identified signal-to-interference ratio errors using statistical variance, where the instability indicator indicates a risk of a potential uplink transmission power rush in the cell; and scheduling one or more uplink mobile radio transmissions by dynamically adjusting a headroom of available power in the cell based on the instability indicator to avoid an uplink transmission power rush.

2. The method in claim 1, wherein the scheduling headroom of available power for scheduled channels between a maximum power level set for the cell and a power level needed for non-scheduled channels.

3. The method in claim 1, further comprising: determining whether the instability indicator should be issued; increasing the headroom of available power if the instability indicator is not issued so that more resources are available for the one or more uplink mobile radio transmissions; and decreasing the headroom of available power if the instability indicator is issued so that fewer resources are available for the one or more uplink mobile radio transmissions.

4. The method in claim 1, wherein multiple signal-to-interference ratio errors are determined for selected connections, the method further comprising:
determining a variance of the multiple signal-to-interference ratio errors;
determining an instability indicator associated with the cell a based on the variance; and
determining whether the instability indicator should be issued.

5. The method in claim 4, further comprising:
using a leaky bucket procedure to process the variance to determine whether the instability indicator should be issued.

6. The method in claim 1, further comprising:
determining a maximum uplink coverage load for the cell;
determining a maximum uplink stability load for the cell; and
determining a maximum uplink load for the cell based on the lower one of the maximum uplink coverage load and the maximum uplink stability load.

7. The method in claim 6, wherein the maximum uplink coverage load corresponds to a first maximum rise over thermal noise level for the cell, the maximum uplink stability load corresponds to a second maximum rise over thermal noise level for the cell, and the maximum rise over thermal noise level for the cell is the minimum of the first and second maximum rise over thermal noise levels.

8. The method in claim 1, further comprising:
averaging the estimated uplink signal-to-interference ratios for each connection, and
selecting one or more of the averaged uplink signal-to-interference ratio estimates that exceed a signal-to-interference ratio estimate threshold for use in determining one or more signal-to-interference ratio errors.

9. The method in claim 1 implemented in a radio base station and the scheduling decision relates to grants to one or more mobile radio terminals to transmit over an enhanced uplink channel.

10. A programmable electronic circuitry for use in a serving cell in a cellular communications system where the serving cell supports multiple mobile radio terminal connections with mobile radio terminals configured to: estimate uplink signal-to-interference ratios for mobile radio terminal connections; determine signal-to-interference ratio errors for the estimated uplink signal-to-interference ratios; identify one or more signal-to-interference ratio errors that exceed a signal-to-interference ratio error threshold; determine an instability condition associated with the cell based on the one or more identified signal-to-interference ratio errors, where the instability indicator indicates a risk of a potential uplink transmission power rush in the cell; and prevent an uplink transmission power rush in the cell based on the determined instability indicator by dynamically adjusting a headroom of available power.

11. Apparatus for use in a base station associated with a serving cell in a cellular communications system where the serving cell supports connections with mobile radio terminals, comprising electronic circuitry programmably configured to: select a number of active uplink mobile radio terminal connections at the serving cell; estimate uplink signal-to-interference ratios for the number of mobile radio terminal connections; determine a signal-to-interference ratios error for one or more of the estimated uplink signal-to-interference ratios; identify one or more signal-to-interference ratio errors that exceed a signal-to-interference ratio error threshold; determine an instability indicator associated with the cell based on the one or more identified signal-to-interference ratio errors; and make a decision for scheduling one or more uplink mobile radio transmissions in the cell based on the instability indicator.

12. The apparatus of claim 11, wherein the scheduling decision is based on a headroom of available power for scheduled channels between a maximum power level set for the cell and a power level needed for non-scheduled channels.

13. The apparatus in claim 11, wherein the electronic circuitry is further programmably configured to: determine whether the instability indicator should be issued; increase the headroom of available power if the instability indicator is not issued so that more resources are available for the one or more uplink mobile radio transmissions; and decrease the headroom of available power if the instability indicator is issued so that fewer resources are available for the one or more uplink mobile radio transmissions.

14. The apparatus in claim 11, wherein the electronic circuitry is further programmably configured to:
prevent a transmission power rush in the uplink in the cell using the instability factor.

15. The apparatus in claim 11, wherein the electronic circuitry is further programmably configured to:
determine multiple signal-to-interference ratio errors selected connections;

determine a variance of the multiple signal-to-interference ratio errors;

determine an instability indicator associated with the cell a based on the variance; and determine whether the instability indicator should be issued.

16. The apparatus in claim 15, wherein the electronic circuitry is further programmably configured to:

use a leaky bucket procedure to process the variance to determine whether the instability indicator should be issued.

17. A programmable electronic circuitry for use in a serving cell in a cellular communications system where the serving cell supports connections with mobile radio terminals configured to: estimate uplink signal-to-interference ratios for multiple mobile radio terminal connections; determine signal-to-interference ratio errors for the estimated uplink signal-to-interference ratios; identify one or more signal-to-interference ratio errors that exceed a signal-to-interference ratio error threshold; determine an instability condition associated with the cell based on the one or more identified signal-to-interference ratio errors using statistical variance; and prevent an uplink transmission power rush in the cell based on the determined instability condition by dynamically adjusting a headroom of available power, wherein the electronic circuitry is further programmably configured to: determine a maximum uplink coverage load for the cell; determine a maximum uplink stability load for the cell; and determine a maximum uplink load for the cell based on the lower one of the maximum uplink coverage load and the maximum uplink stability load.

18. The apparatus in claim 17, wherein the maximum uplink coverage load corresponds to a first maximum rise over thermal noise for the cell, the maximum uplink stability load corresponds to a second maximum rise over thermal noise level for the cell, and the maximum rise over thermal noise level for the cell is the minimum of the first and second maximum rise over thermal noise levels.

19. The apparatus in claim 11, wherein the electronic circuitry is further programmably configured to:

average the estimated uplink signal-to-interference ratios for each connection, and select one or more of the averaged uplink signal-to-interference ratio estimates that exceed a signal-to-interference ratio estimate threshold for use in determining one or more signal-to-interference ratio errors.

20. The apparatus in claim 11, wherein the electronic circuitry is further programmably configured to:

grant an uplink transmission request at a particular data rate based on the instability indicator.

* * * * *

UNITED STATES PATENT AND TRADEMARK OFFICE
CERTIFICATE OF CORRECTION

| | | |
|---|---|---|
| PATENT NO. | : 7,983,687 B2 | Page 1 of 1 |
| APPLICATION NO. | : 11/798331 | |
| DATED | : July 19, 2011 | |
| INVENTOR(S) | : Englund et al. | |

It is certified that error appears in the above-identified patent and that said Letters Patent is hereby corrected as shown below:

In Column 1, Line 24, delete "(HSPDA)" and insert -- (HSDPA) --, therefor.

In Column 1, Line 49, delete "HSPDA," and insert -- HSDPA, --, therefor.

In Column 11, Line 49, in Claim 4, delete "a based" and insert -- based --, therefor.

In Column 13, Line 3, in Claim 15, delete "cell a" and insert -- cell --, therefor.

Signed and Sealed this
Twentieth Day of December, 2011

David J. Kappos
*Director of the United States Patent and Trademark Office*